(12) United States Patent  (10) Patent No.: US 8,174,709 B2
Nagahara et al.  (45) Date of Patent: May 8, 2012

(54) IMAGE PROCESSING APPARATUS, COMPUTER PROGRAM PRODUCT, AND PREVIEW IMAGE DISPLAYING METHOD

(75) Inventors: Takanori Nagahara, Kanagawa (JP); Tetsuya Sakayori, Tokyo (JP); Junichi Takami, Kanagawa (JP); Takashi Yano, Tokyo (JP); Yoshifumi Sakuramata, Tokyo (JP); Hiroko Mano, Tokyo (JP); Haruo Shida, Kanagawa (JP); Iwao Saeki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/137,739

(22) Filed: Sep. 9, 2011

(65) Prior Publication Data
US 2012/0002231 A1   Jan. 5, 2012

Related U.S. Application Data

(63) Continuation of application No. 11/833,288, filed on Aug. 3, 2007, now Pat. No. 8,040,579.

(30) Foreign Application Priority Data

Aug. 3, 2006  (JP) ................................. 2006-212563

(51) Int. Cl.
*G06F 15/00* (2006.01)
*G06F 3/12* (2006.01)
*G06K 1/00* (2006.01)

(52) U.S. Cl. ....................................... 358/1.13; 358/1.1
(58) Field of Classification Search ......................... None
See application file for complete search history.

(56) References Cited

U.S. PATENT DOCUMENTS

| 6,115,510 | A | 9/2000 | Koga |
| 6,473,539 | B1 | 10/2002 | Koga |
| 7,184,165 | B2 * | 2/2007 | Mori et al. ................... 358/1.15 |
| 7,599,100 | B2 | 10/2009 | Higuchi et al. |
| 2001/0020247 | A1 | 9/2001 | Ikeda et al. |
| 2002/0052897 | A1 | 5/2002 | Nishikawa et al. |
| 2004/0085563 | A1 | 5/2004 | Nishimura |
| 2004/0126122 | A1 | 7/2004 | Kanamoto et al. |

(Continued)

FOREIGN PATENT DOCUMENTS

CN  1523872 A  8/2004
JP  2001-067347  3/2001

(Continued)

OTHER PUBLICATIONS

Office Action issued by the Japanese Patent Office dated Jul. 26, 2011 for corresponding Japanese Patent Application No. 2006-212563.

*Primary Examiner* — Douglas Tran
(74) *Attorney, Agent, or Firm* — Harness, Dickey & Pierce, P.L.C.

(57) ABSTRACT

The image data processing apparatus includes a storage unit to store image data having a process setting. The image data processing apparatus includes a selection screen display unit to display the one or more image data stored in the storage unit and to display a selection screen to select whether to use a process content associated with image data selected from the displayed image data if the one segment of image data is used. The image data processing apparatus includes a display control unit to display, on the display device, a preview image reflecting the process content based on the associated process content.

9 Claims, 19 Drawing Sheets

U.S. PATENT DOCUMENTS

| | | |
|---|---|---|
| 2005/0168763 A1 | 8/2005 | Higuchi et al. |
| 2005/0243371 A1 | 11/2005 | Kanaya et al. |
| 2006/0066899 A1 | 3/2006 | Yoshida |
| 2006/0158706 A1 | 7/2006 | Mori et al. |
| 2009/0273806 A1 | 11/2009 | Nishikawa et al. |

FOREIGN PATENT DOCUMENTS

| | | |
|---|---|---|
| JP | 2002-232684 | 8/2002 |
| JP | 2004-104442 | 4/2004 |
| JP | 2006-003568 | 1/2006 |
| JP | 2006-146662 | 6/2006 |

* cited by examiner

FIG.4

| SETTING ITEM | POSITION (UPPER LEFT AND LOWER RIGHT COORDINATES) |
|---|---|
| STAPLE | (0, 0) (40, 40) |
|  | (120, 0) (160, 40) |
| PUNCH | (0, 40) (40, 270) |
|  | (40, 0) (200, 40) |
| MARGIN SHIFT |  |

IMAGE PROCESSING APPARATUS, COMPUTER PROGRAM PRODUCT, AND PREVIEW IMAGE DISPLAYING METHOD

CROSS-REFERENCE TO RELATED APPLICATIONS

This U.S. nonprovisional application is a continuation and claims priority under 35 U.S.C. §120 U.S. on U.S. application Ser. No. 11/833,288, filed Aug. 3, 2007 now U.S. Pat. No. 8,040,579, which claims priority under 35 U.S.C. §119 to Japanese Patent Application No. 2006-212563, filed on Aug. 3, 2006, in the Japanese Intellectual Property Office, the entire contents of each of which is hereby incorporated herein by reference.

BACKGROUND OF THE INVENTION

1. Field of the Invention

The present invention relates to an image processing apparatus, a computer program product, and a preview image displaying method.

2. Description of the Related Art

In recent years, image forming apparatuses have been commonly used, such as scanners that scan original images, copiers that print the original images scanned by the scanners, printers and facsimile machines that print image data input from the outside, and multifunction products (MFPs) that have functions of these apparatuses.

Such image forming apparatuses provide various functions, and allow a user to specify various settings as to the functions. The settings includes those concerning an original such as type and density of the original, those concerning image processing such as zoom ratio, simplex/duplex printing, and a margin size, and those concerning finishing such as stamping, stapling, and punching.

However, in the conventional image forming apparatuses, when a user sets such a finish function and starts printing, the user cannot check a finished state until a print result is obtained. For example, even if punch holes overlap an image in a finished state, it is not until the image is actually printed that the user notices this, which results in a waste of sheets.

To solve such a problem, Japanese Patent Application Laid-Open No. 2001-67347 discloses an image forming apparatus that can display, prior to printing, a preview image of a finish result obtained by applying image processing with various functions to a pre-scanned original image to allow a user to change print settings when necessary.

The applicant has proposed, in Japanese Patent Application Laid-Open No. 2006-003568, an intuitive and highly convenient user interface. With the user interface, when a user touches a specific position in a preview image of an original, a menu related to the position is displayed to allow the user to select a desired function for printing. Setting of a function selected by the user is immediately reflected in the preview image.

With the user interface, the user can check a setting state through the preview image while specifying settings. However, once printing is performed, setting information is cleared. Therefore, when the user wishes to specify an additional setting or specify the same settings again, the user has to perform setting work from the beginning, which reduces convenience for the user.

SUMMARY OF THE INVENTION

It is an object of the present invention to at least partially solve the problems in the conventional technology.

According to an aspect of the present invention, an image processing apparatus includes a preview creating unit that creates a preview image indicating a result of processing an image based on setting specified for the image, a display unit that displays the preview image, a storage unit that stores therein the preview image, and a restoring unit that reads the preview image from the storage unit and displays the preview image on the display unit to restore the setting.

According to another aspect of the present invention, a preview image displaying method includes creating a preview image indicating a result of processing an image based on setting specified for the image, displaying the preview image, storing the preview image, and restoring the setting by reading the preview image stored at the storing and displaying the preview image.

According to still another aspect of the present invention, a computer program product includes a computer usable medium having computer readable program codes embodied in the medium that, when executed, cause a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of contents of an association table in which setting items are associated with positions;

DETAILED DESCRIPTION OF THE PREFERRED EMBODIMENTS

Exemplary embodiments of the present invention are explained in detail below referring to the accompanying drawings.

A first embodiment of the present invention is explained referring to FIGS. 1 to 11. An image processing apparatus according to the first embodiment is a multifunction product (MFP) that has a copy function, a facsimile (FAX) function, a print function, a scanner function, a function of delivering an input image (an original image scanned by the scanner function or an image input by the FAX function), and the like.

Figure 1:
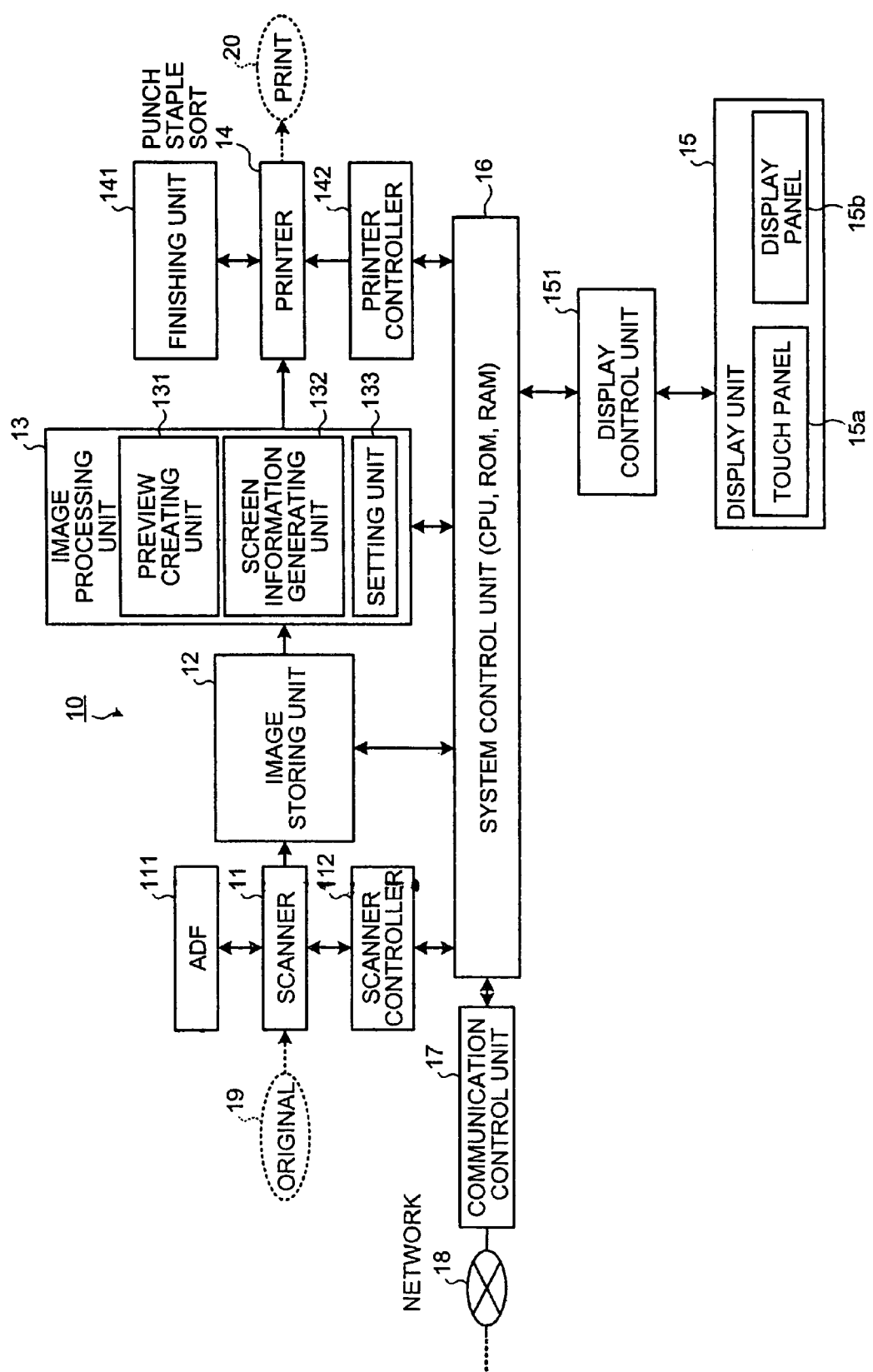
FIG. 1 is a functional block diagram of an image processing apparatus according to a first embodiment of the present invention.

FIG. 1 is a functional block diagram of an MFP 10 according to the first embodiment. The MFP 10 includes a scanner 11, an auto document feeder (ADF) 111, a scanner controller 112, an image storing unit 12, an image processing unit 13, a printer 14, a printer controller 142, a finishing unit 141, a display unit 15, a display control unit 151, a system control unit 16, and a communication control unit 17. The MFP 10 is connected to a network 18 via the communication control unit 17. The MFP 10 scans an image of an original 19, applies image processing to the image, and outputs the image as a print 20.

The system control unit 16 is connected to the respective units and controls the MFP 10. For example, the system control unit 16 provides the scanner 11 with scanning area information appropriate for a selected sheet size. This system control unit 16 includes a central processing unit (CPU), a read only memory (ROM), and a random access memory (RAM). The CPU operates while using a work area of the RAM based on a computer program stored in the ROM, whereby various kinds of processing are performed.

The computer program executed in the MFP 10 can be stored in a computer readable recording medium such as a compact disk-read only memory (CD-ROM), a flexible disk (FD), a compact disk-recordable (CD-R), or a digital versatile disk (DVD) as a file of an installable format or an executable format. In this case, the CPU of the system control unit 16 loads the computer program from the recording medium into a main storage (not shown) to execute it, whereby various functions of the MFP 10 can be realized. The computer program can be stored in a computer connected to the network 18 such as the Internet, and downloaded through the network. the computer program can also be distributed through the network 18.

The communication control unit 17 is connected to the network such as a local area network (LAN) or the Internet and exchanges image data, control data, and the like with other apparatuses connected to the network according to a communication protocol.

The scanner controller 112 receives a command from the system control unit 16 and controls the scanner 11.

The scanner 11 is controlled by the scanner controller 112 and converts an image of the original 19 into digital image data. The ADF 111 sequentially delivers a plurality of pages of originals set thereon to a scanning position of the scanner 11 one by one. Thus, the scanner 11 can automatically and sequentially scan the originals. The ADF 111 can deliver not only an original printed on one side thereof but also an original printed on both sides thereof by reversing the original. Thus, it is possible to cause the scanner 11 to scan the both sides of original.

The image storing unit 12 is a buffer memory that receives a command from the system control unit 16 and temporarily stores therein image data scanned by the scanner 11, image data input from the outside through the network 18, and the like. The MFP 10 can process image data input from the outside through the network 18 as well as image data scanned by the scanner 11 to form an image.

The image processing unit 13 receives a command from the system control unit 16, applies γ correction, modulation transfer function (MTF) correction, and the like to multi-value data sent from the scanner 11 and temporarily stored in the image storing unit 12. The image processing unit 13 performs gradation processing such as slicing and dithering on the data, and digitalizes (multi-value) the data. The image processing unit 13 performs various kinds of image processing (reduce/enlarge, adjustment of density and colors, etc.) corresponding to functions set by a user, image-area edit (area erasure, area movement, area reversal, etc.), and layout processing (duplex/simplex printing, image combining, margin adjustment, etc.). Thus, the image processing unit 13 creates a preview image indicating a finished state of an image.

The image processing unit 13 includes a preview creating unit 131, a screen information generating unit 132, and a setting unit 133.

Basically, the preview creating unit 131 creates a preview of the original image (a preview image) based on settings or parameters specified for processing image data obtained by pre-scanning an original image and displayed on a display panel 15b. Namely, the preview creating unit 131 creates a preview image indicating a results of processing an original image. The preview creating unit 131 uses the multi-value data temporarily stored in the image storing unit 12.

The screen information generating unit 132 generates input screen information displayed on the display panel 15b. The input screen information includes various types of setting items for the preview image created by the preview creating unit 131.

When the user provides setting input on an input screen 400 displayed on the display panel 15b through a touch panel 15a, described later, the setting unit 133 receives a signal of the setting input and acquires coordinate information concerning an input image stored in the image storing unit 12.

When the setting unit 133 receives a setting-input signal, the preview creating unit 131 updates the preview image according to the setting-input signal. The preview creating unit 131 displays the update preview image.

The screen information generating unit 132 generates, according to the setting-input signal received by the setting unit 133, input screen information for display of a screen for receiving setting input from the user again. The display panel 15b updates and displays the input screen 400 according to the input screen information.

The printer controller 142 receives a command from the system control unit 16 and controls the printer 14.

The printer 14 is mounted with the finishing unit 141. The finishing unit 141 performs finishing, based on automatic setting or setting specified by the user, such as sorting, by a unit of the number of copies or a page, a print 20 obtained by printing, stamping a predetermined stamp on a print medium, aligning a plurality of print media and stapling the print media, and punching punch holes for binding the print media in a binder or a file.

The display control unit 151 receives a command from the system control unit 16 and controls input and output of the display unit 15. For example, the display control unit 151 controls to output data processed by the image processing unit 13 to the touch panel 15a and the display panel 15b. More specifically, the display control unit 151 causes the display panel 15b to display a preview image. The display control unit 151 controls input from the touch panel 15a. The display panel 15b and the touch panel 15a are separately shown in FIG. 1; however, they are explained as being integrated in the following description.

The touch panel 15a detects a position with which a pointer makes an electric or magnetic contact. As pointing means (not shown) for pointing a position on the touch panel 15a, a finger tip, a stylus pen, and other touch input tools (hereinafter, "pointers") can be used. The user inputs various settings or parameters including print setting by touching the touch panel 15a with such a pointer.

In the first embodiment, an example is explained in which input is provided by touching the touch panel 15a. However, input can be provided in other manners. For example, the display unit 15 can include a hard key (physical key) that a user presses to issue a command such as a print command. As the display panel 15b, a dedicated display device included in the MFP 10 can be used.

The display unit 15 is controlled by the display control unit 151, receives input of setting details via the touch panel 15a, and displays a preview image and setting items for specifying settings as to the preview image on the display panel 15b.

The display unit 15 displays functions available in the MFP 10 as setting items and receives from the user setting input indicating a setting item selected from the setting items. When a user touches with the pointer a position on the touch panel 15a, a coordinate of the position is detected. When the position is in an area corresponding to an setting item (where the setting item is selectable), the display control unit 151 determines that the setting item is selected. For example, the display unit 15 receives setting of scanning conditions for the scanner 11 corresponding to the state of an original, setting for the image processing unit 13 that performs processing such as image quality adjustment on scanned image data, setting of print conditions for the printer 14, and setting for the finishing unit 141 that applies finishing such as sorting, stapling, and punching to a print after printing.

Upon receiving a setting as described above via the display control unit 151, the system control unit 16 causes the image processing unit 13 to create a preview image by reflecting the setting on the original image data stored in the image storing unit 12. The system control unit 16 sends the preview image to the display unit 15 such that the display unit 15 displays the preview image.

Figure 2:
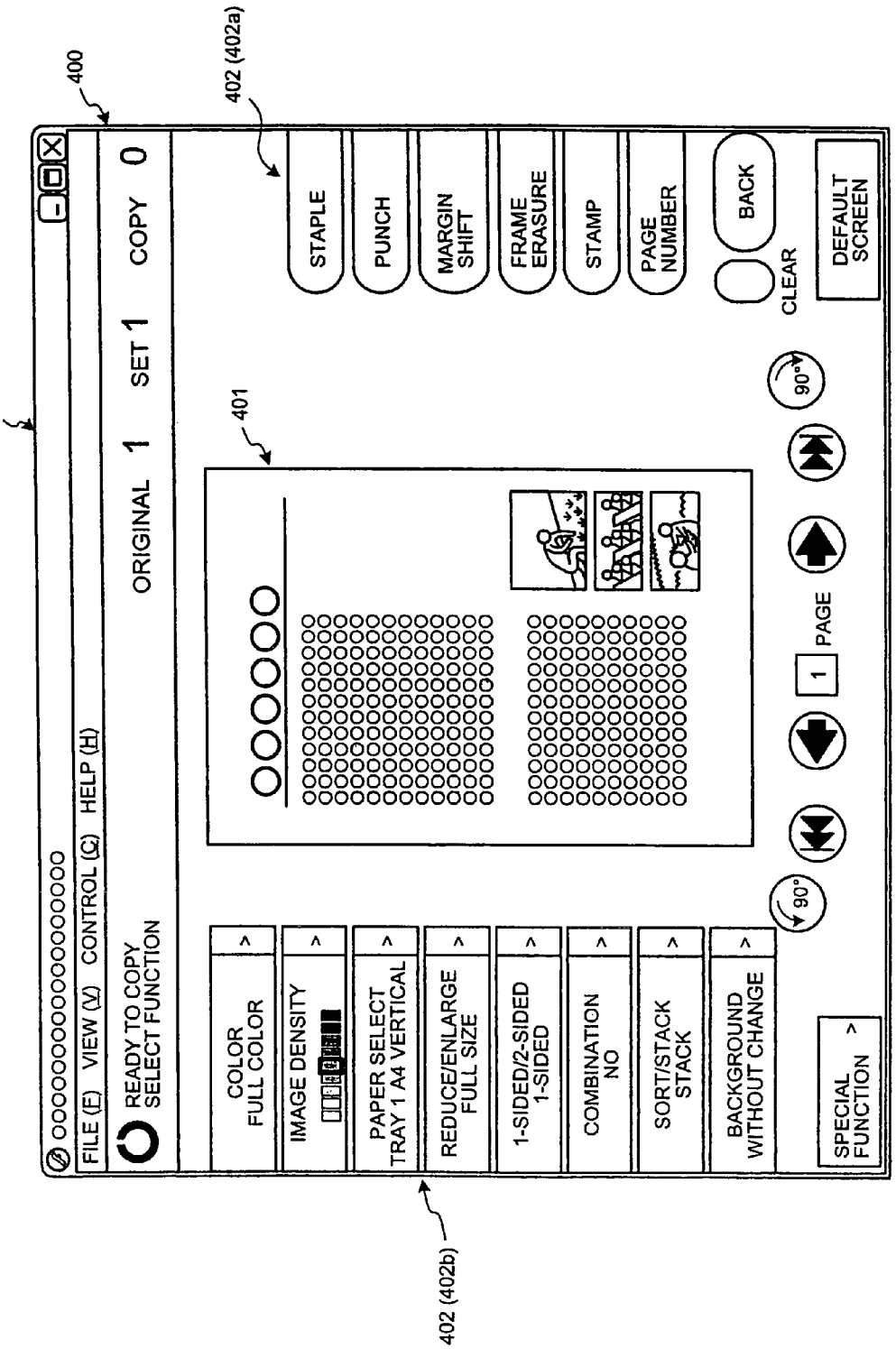
FIG. 2 is an example of an input screen displaying a preview image created by a preview creating unit shown in FIG. 1.

FIG. 2 is an example of a preview image created by the preview creating unit 131 from input image data. A preview image 401 and setting items 402 are displayed on the display panel 15b. As the setting items 402, a menu 402a related to positions on the preview image 401 including items such as staple, punch, margin shift, frame erasure, stamp, and page number is displayed on the right side of the screen. Menu 402b not related to contents such as an output color, output density, sheet, reduce/enlarge, one-sided/two-sided, combination, sort and stack, and background is displayed on the left side of the screen.

When the user touches the touch panel 15a with the pointer while viewing the preview image 401 displayed on the display panel 15b, the touch panel 15a receives input of positional information concerning a spatial position on a print in a finished state displayed as the preview image 401. In such a case, the setting unit 133 analyzes the positional information received through the touch panel 15a and acquires coordinate information on an image with which the pointer comes into contact.

With such a structure, the MFP 10 displays, prior to actual copy printing, the preview image 401 on the display panel 15b. After checking the preview image 401 visually, the user can change the setting when necessary and perform actual printing.

More specifically, it is possible to perform copying reliably according to a series of processes: (1) pre-scanning an original, (2) displaying an image of the original pre-scanned on a screen as a preview image, (3) when a user touches a predetermined position on the preview image, displaying a menu of functions corresponding to the position, (4) when the user selects one of the functions, immediately reflecting the function in the preview image, and, (5) after checking the update preview image on the screen, starting printing.

Figure 3:
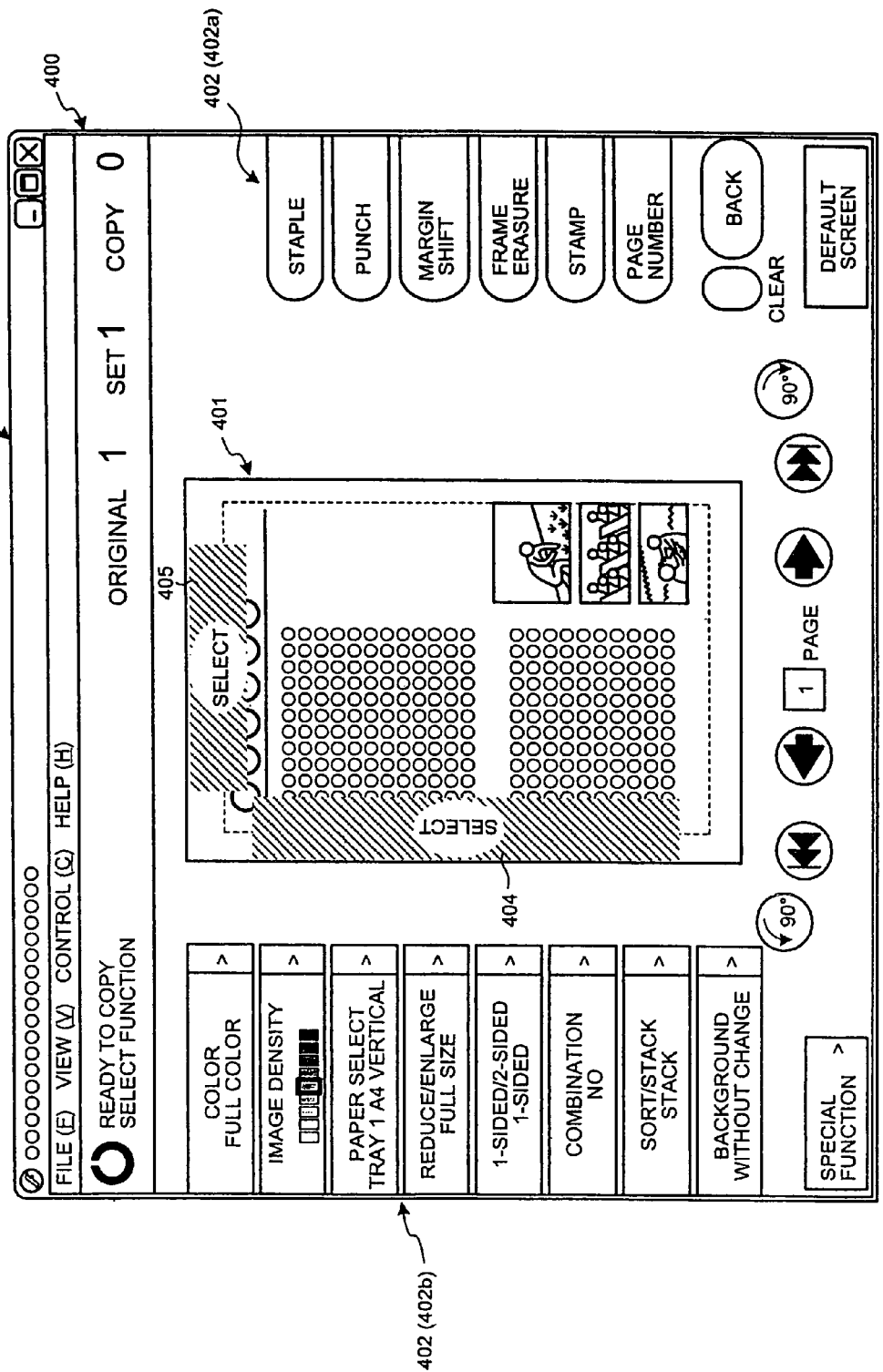
FIG. 3 is the input screen displaying a preview image where setting items are selected.

As shown in FIG. 3, it is assumed that punch 403 is selected from the setting items 402 (the menu 402a) displayed on the display unit 15 by touch input from the user.

When the display unit 15 detects a touch on the punch 403 displayed thereon, the system control unit 16 receives setting of the punch 403 via the display control unit 151. The screen information generating unit 132 reads out an area corresponding to the punch 403 from an association table. In the association table, as shown in FIG. 4, functions corresponding to the setting items 402 are associated with areas where the functions are applicable. The screen information generating unit 132 displays areas 404 and 405 where the punch 403 can be applied on the display unit 15. The areas 404 and 405 where punch holes can be opened can be displayed in the preview image 401 in an overlapping form or an overwrite form. The areas 404 and 405 can also be displayed with a different color, as being blinking, or with other areas darkening out. The areas indicated by the association table shown in FIG. 4 are defined by a rectangle having sides parallel in main scanning and sub-scanning directions, respectively, defined by diagonal lines each connecting two points defined by coordinates. For example, an area for "staple" is defined by a line from (0,0) to (40,40) and a line from (120,0) to (160,40).

Figure 5:
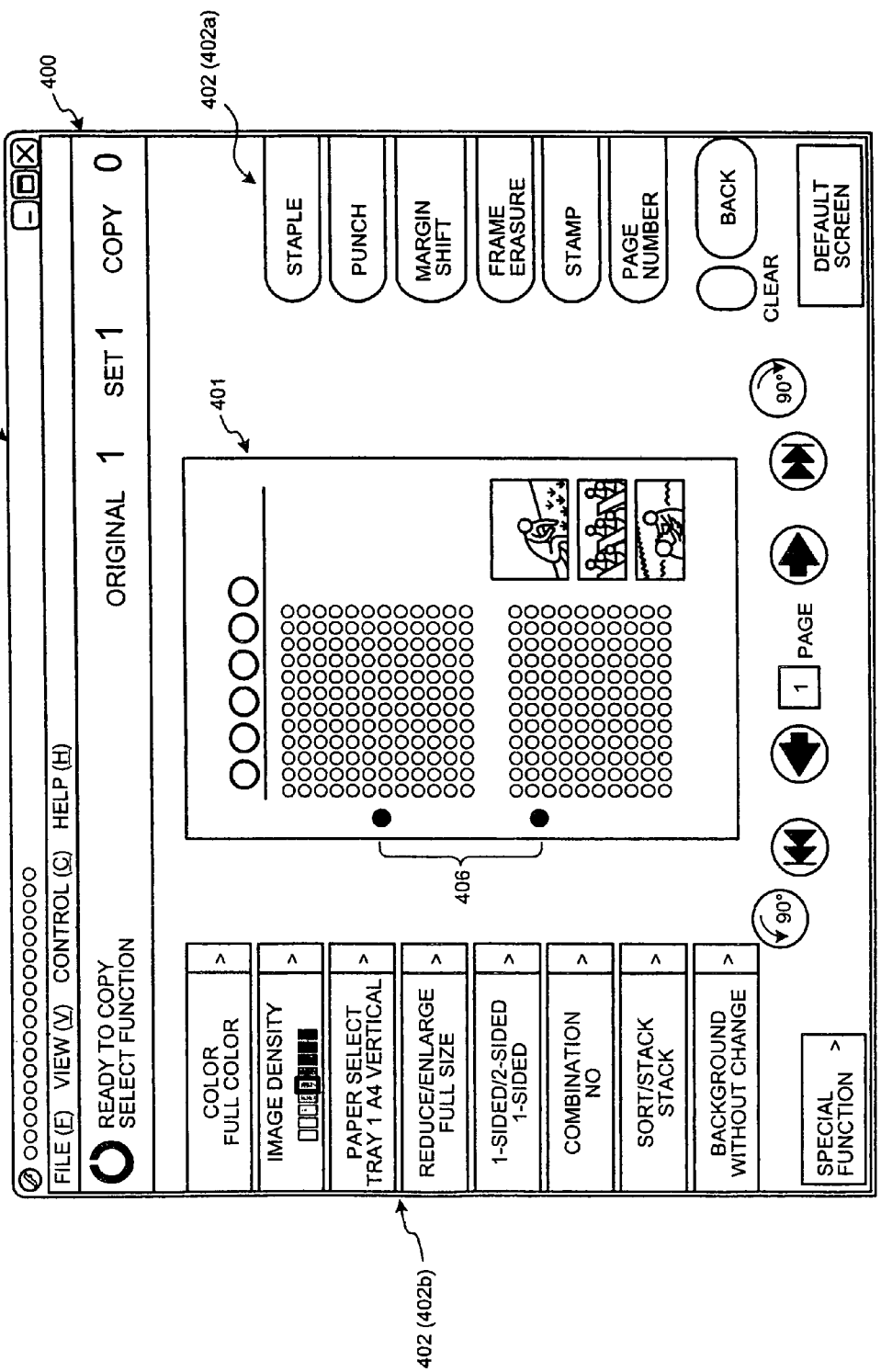
FIG. 5 is the input screen displaying a preview image to which punching has been applied.

The user provides touch input by touching the punch hole area 404 shown in FIG. 3. The display unit 15 receives the touch input on the punch 403. The preview creating unit 131 creates a preview image by reflecting the setting for applying punching in the area, sends the preview image to the display unit 15. Accordingly, the display unit 15 displays the preview image. The preview image 401 subjected to punching 406 is shown in FIG. 5. Setting input such as correction is received through the preview image 401 displayed in this way. The setting is reflected and displayed again. When there is no setting input, printing is performed.

Although not shown, when the user touches a specific position on the preview image, a menu of functions related to the position can be displayed, such that when a user selects one of the functions, the function can be immediately reflected in the preview image.

In addition, the MFP 10 is also capable of printing an image based on the last or previous preview image and the last or previous settings without pre-scanning.

Figure 6:
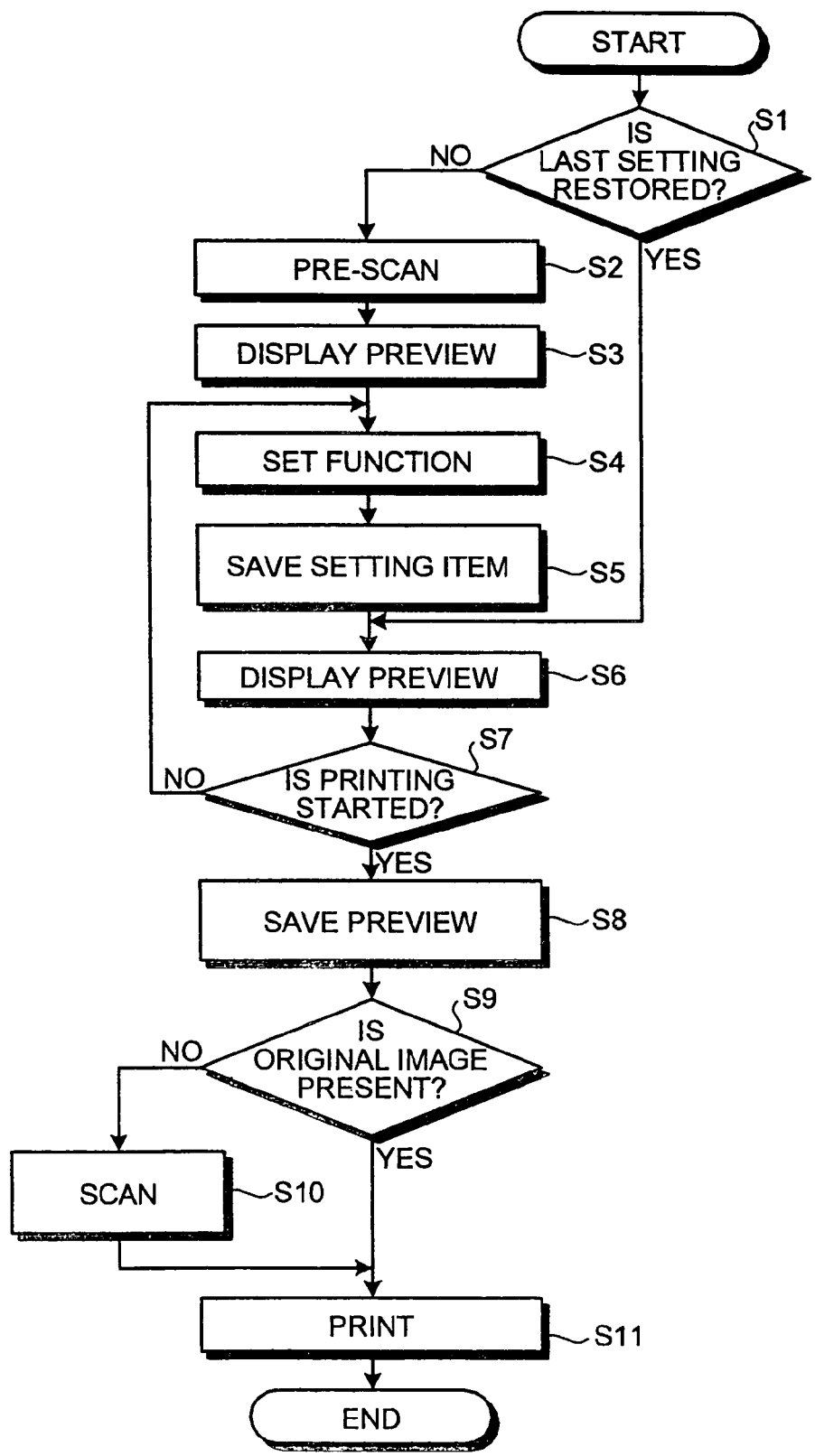
FIG. 6 is a flowchart of a preview-edit process.
Figure 7:
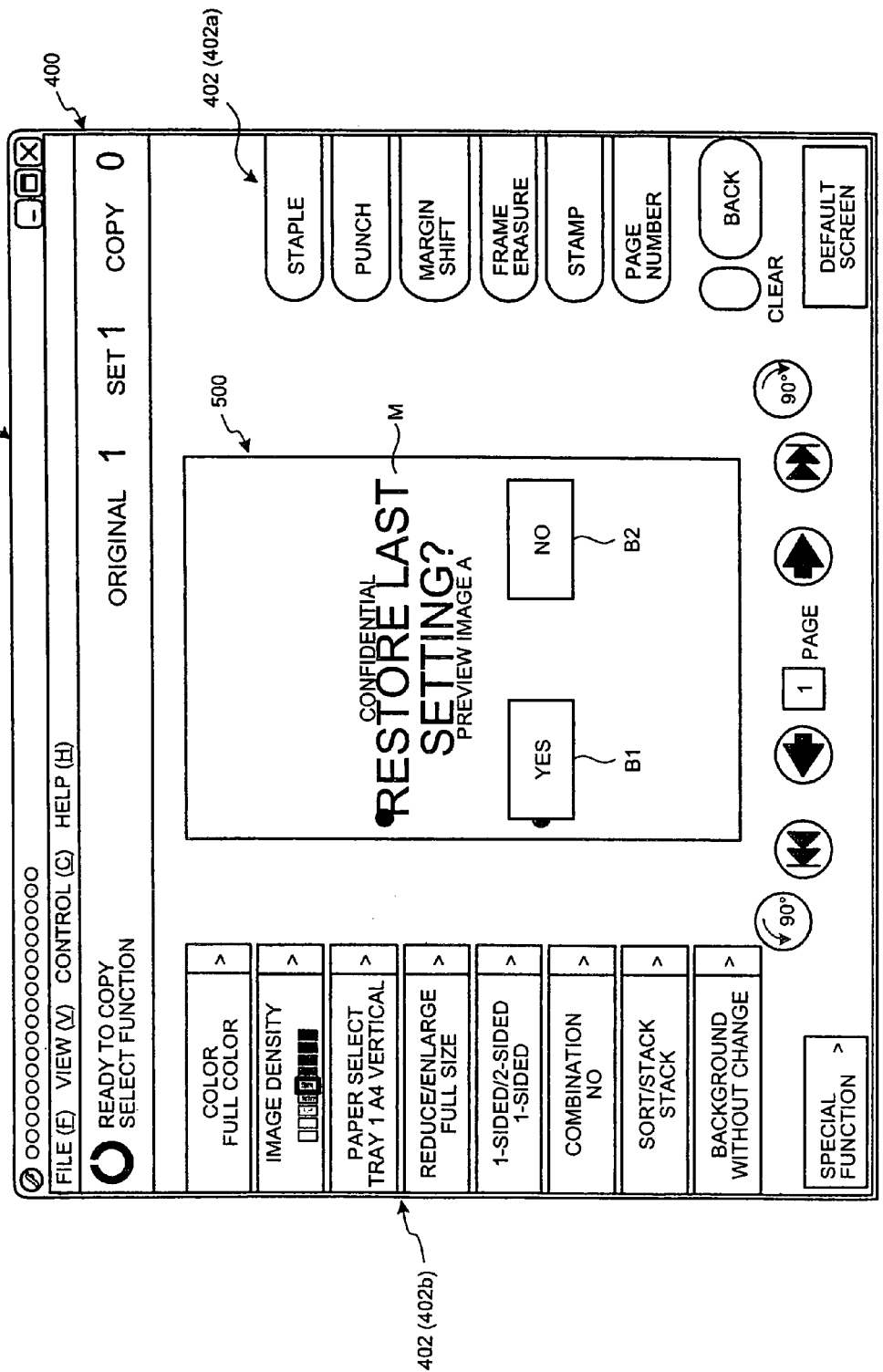
FIG. 7 is an example of a default screen in the preview-edit process.
Figure 8:
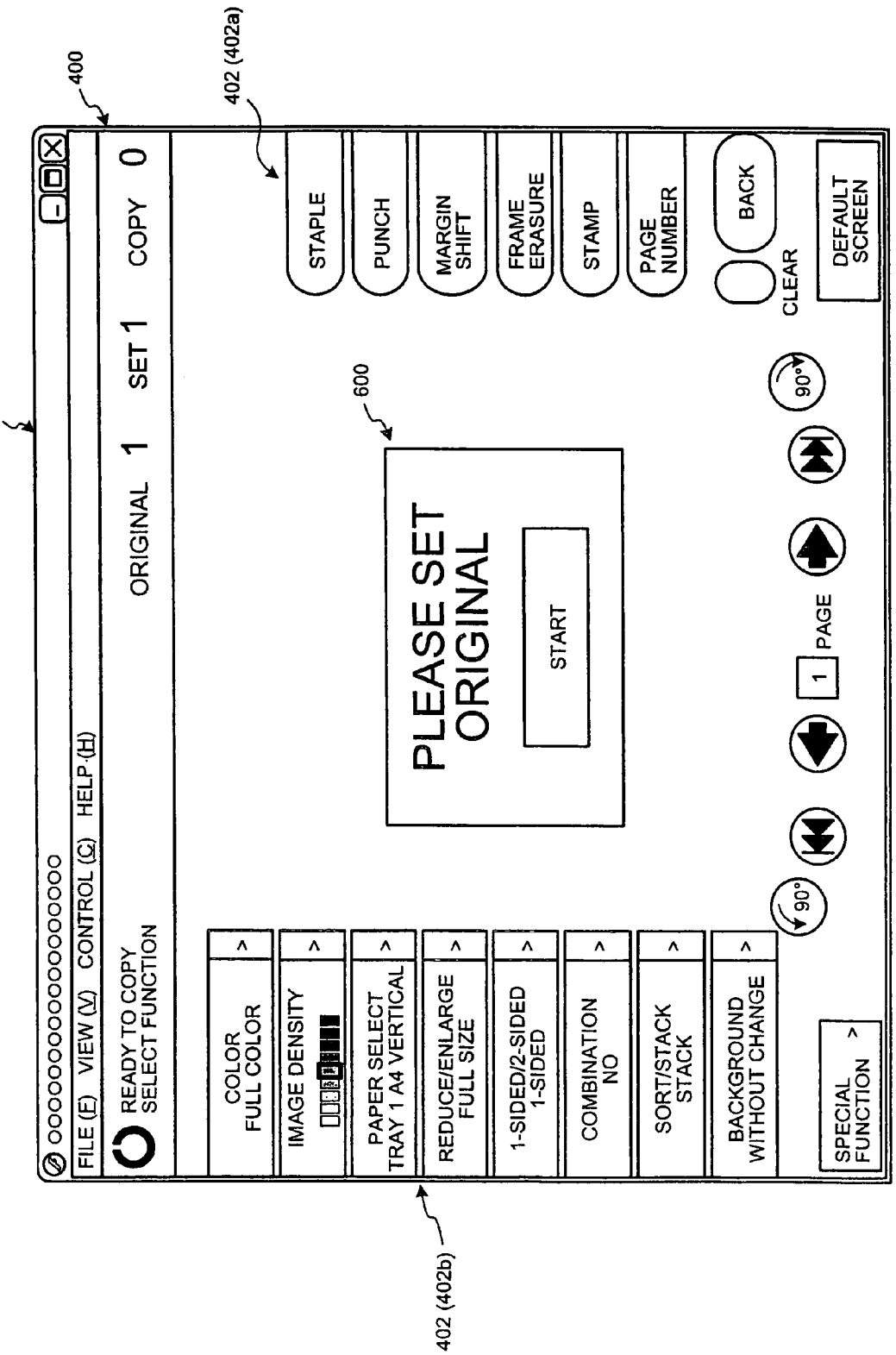
FIG. 8 is the input screen displayed during the preview-edit process.

Preview-edit process according to the first embodiment is explained referring to FIG. 6. First, the CPU displays a default screen 500 in the preview-edit process such that a user can select, before pre-scanning of an original to be printed, whether the last setting is restored. FIG. 7 is an example of the default screen 500. As shown in FIG. 7, on the default screen 500, a "Yes" button B1 and a "No" button B2 are displayed together with a message M "restore last setting?".

When the "No" button B2 is selected via the touch panel 15a, the CPU judges that the last setting is not restored (No at step S1), and printing is performed in a conventional manner. In other words, the CPU displays a screen 600 shown in FIG. 8 for pre-scanning the original (step S2), and displays an image of the original on the display panel 15b as the preview image 401 (see FIG. 2) (step S3). When the user selects one of the setting items 402 via the touch panel 15a (step S4), the CPU saves (stores) the setting item selected (step S5) and displays, on the display panel 15b, the preview image 401 in which the setting is immediately reflected (step S6).

Figure 9:
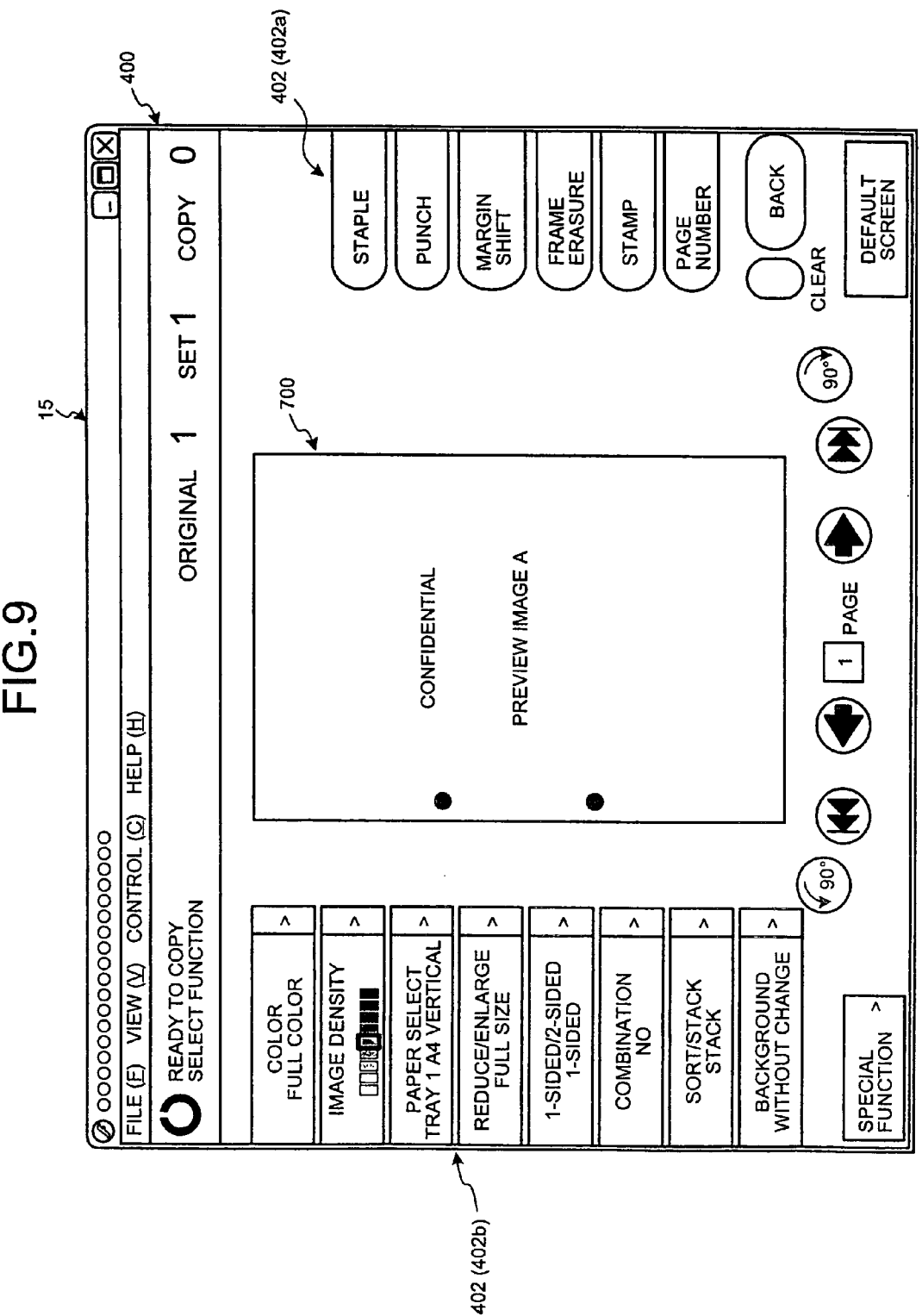
FIG. 9 is the input screen displaying the last preview image (an image scanned last time) in the preview-edit process.

On the other hand, when the "Yes" button B1 is selected via the touch panel 15a, the CPU judges that the last setting is restored (Yes at step S1) and displays the last preview image (an image scanned last time) 700 as shown in FIG. 9, which has already been created and stored in the image storing unit 12, on the display panel 15b (step S6).

The user checks the preview image on the screen, and printing starts according to user's operation of a start key (not shown) on the display unit 15. When the printing is started (Yes at step S7), the CPU saves and stores the preview image displayed on the display panel 15b in the image storing unit 12 (step S8). The preview image saved at step S8 is displayed on the display panel 15b when the setting is required to be restored in the next preview-edit process.

When the user does not start printing (No at step S7) and additionally selects one of the setting items 402 via the touch panel 15a (step S4), the CPU performs the process at steps S5 and S6 again.

After saving the update preview image, when the original image to be printed is not present in the MFP 10 (No at step S9), the CPU causes the scanner 11 to scan the original image (step S10), and causes the printer 14 to print the original image (step S11). On the other hand, when the original image to be printed is present in the MFP 10 (Yes at step S9), the CPU causes the printer 14 to print the original image already scanned by the scanner 11 (step S11).

As described above, according to the first embodiment, the preview image displayed on the display unit 15 is saved and stored. The preview image is read out and displayed on the display unit 15, and settings for the preview image is restored if required. That is, history of setting operation by a user is maintained to restore a setting desired by the user. Thus, it is possible to improve operationality of a user interface of the image processing apparatus.

Figure 10:
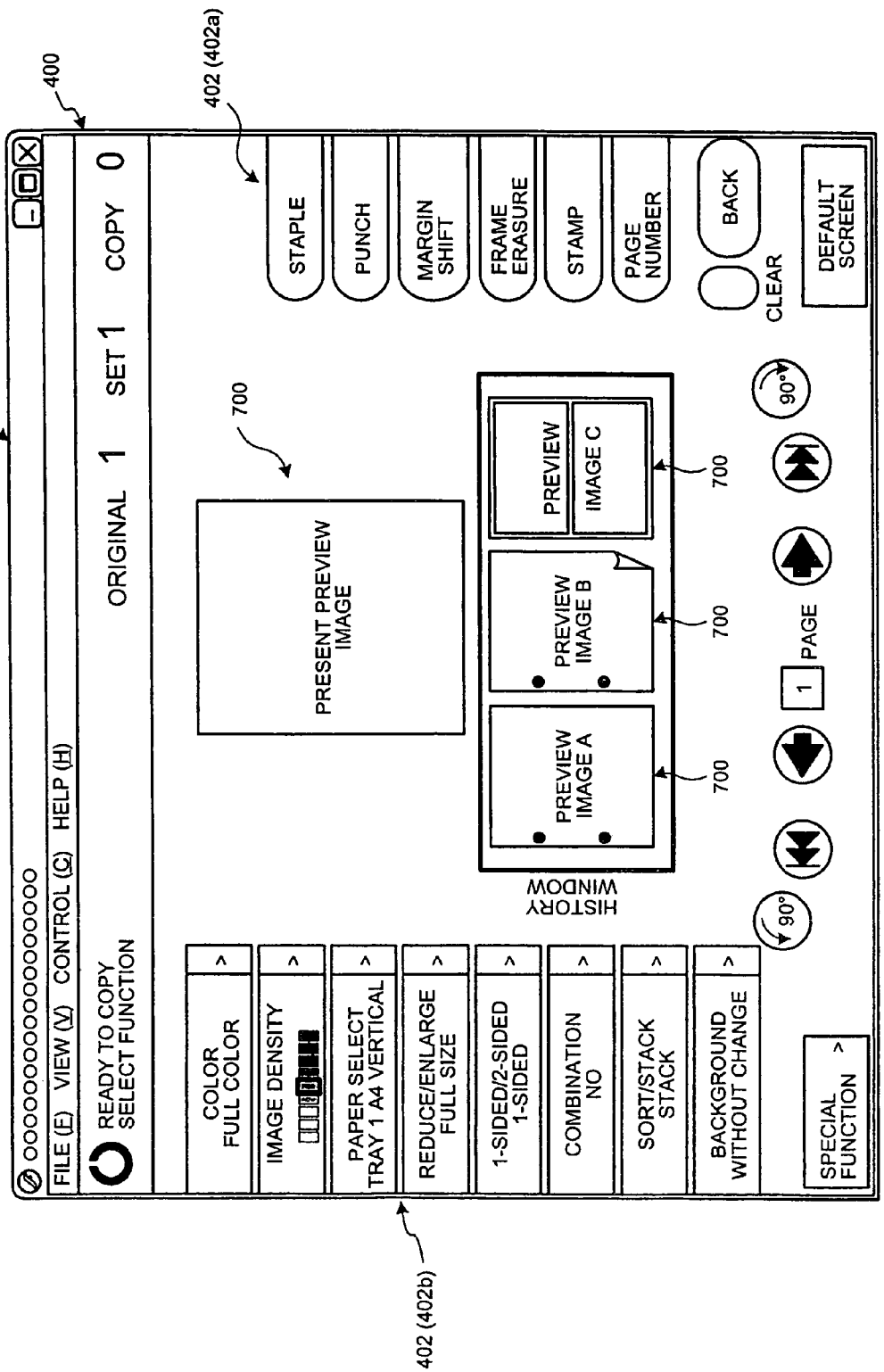
FIG. 10 is the input screen displaying a plurality of preview images.
Figure 11:
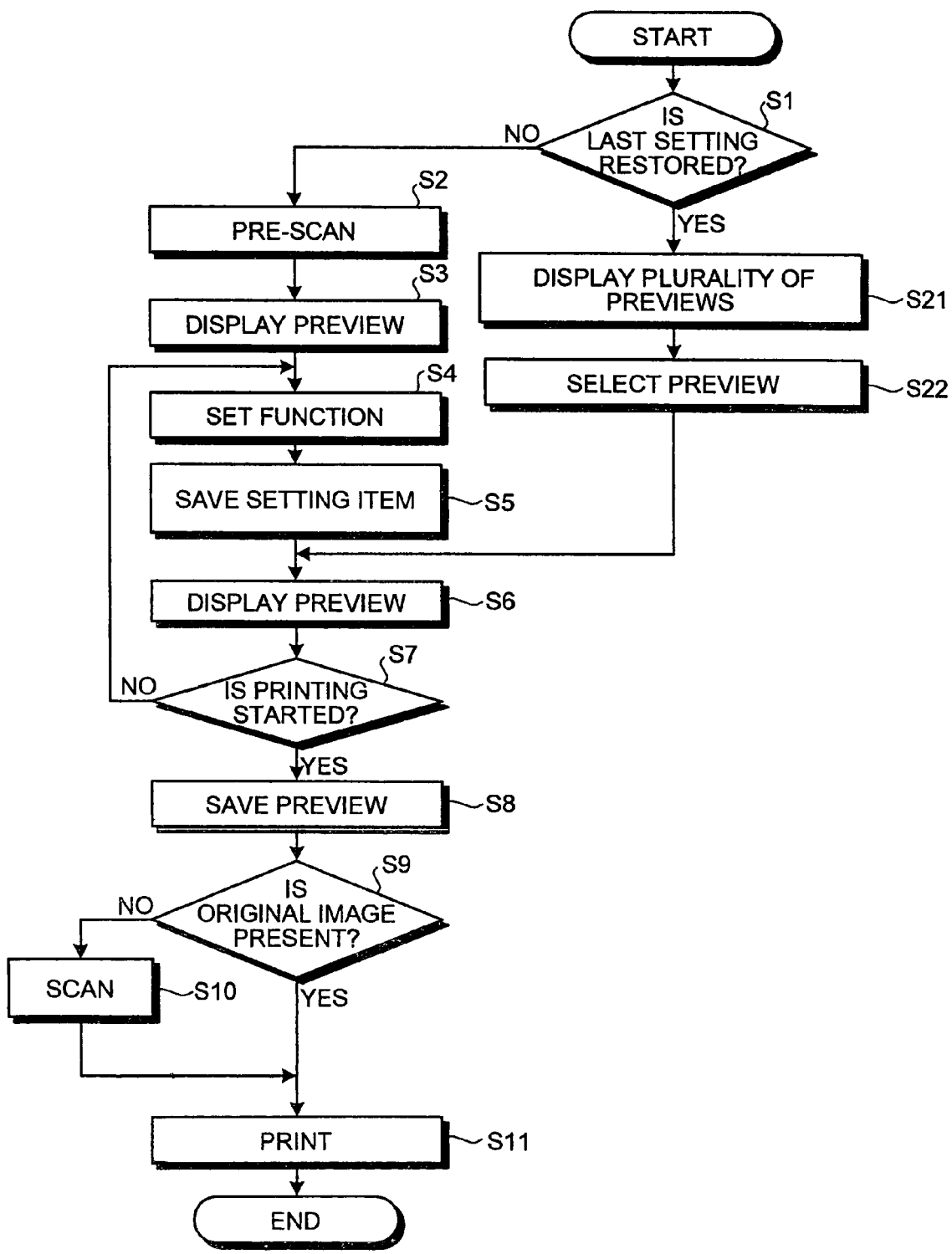
FIG. 11 is another flowchart of the preview-edit process.

In the above description, upon restoring the last setting in the preview-edit process, the single preview image (the image scanned last time) 700 is displayed on the display panel 15b. However, as shown in FIG. 10, a plurality of previous preview images 700 can be displayed on the display panel 15b such that a user can select one of the preview images 700. In this case, when it is judged that the last setting is restored (Yes at step S1), the CPU displays on the display panel 15b the previous preview images 700 based on preview history (step S21). When one of the preview images 700 is selected by the user via the touch panel 15a (step S22), the CPU displays the preview image 700 on the display panel 15b (step S6).

In this way, one preview image is selected from the preview history before pre-scanning, and settings for the preview image is restored. Thus, settings specified, not only most recently, in the past can be restored, and convenience for the user can be improved.

Figure 12:
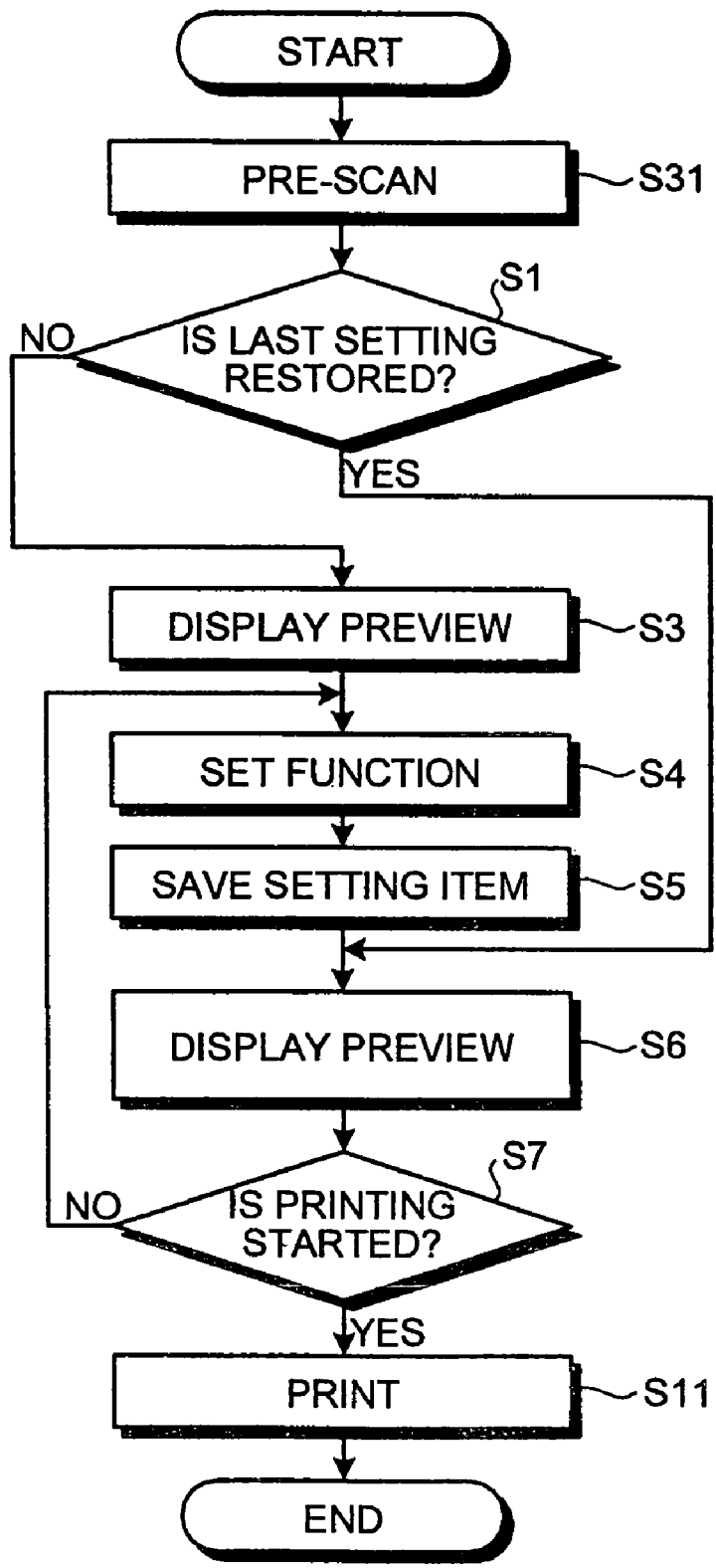
FIG. 12 is a flowchart of a preview-edit process according to a second embodiment of the present invention.
Figure 13:
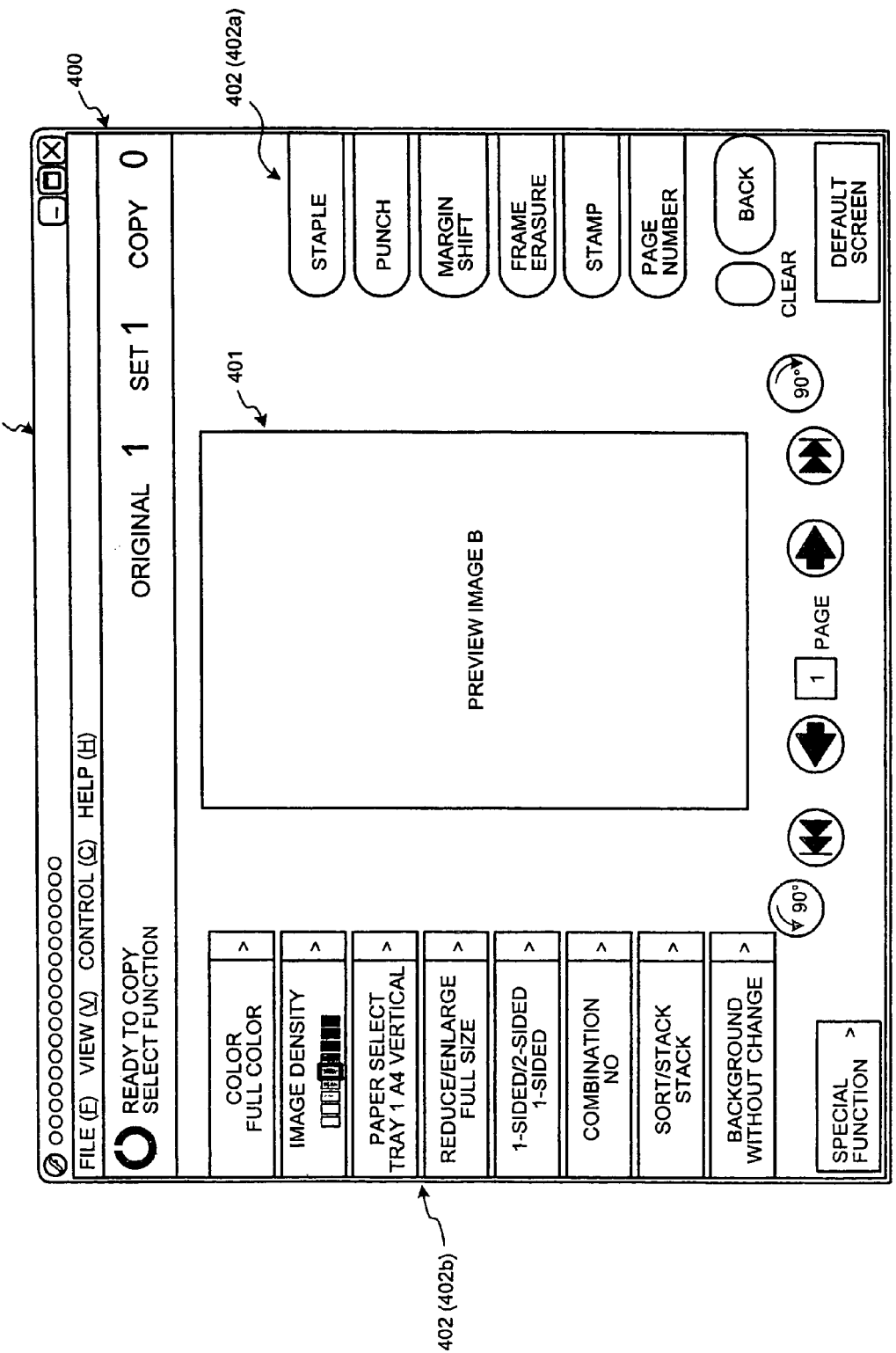
FIG. 13 is the input screen displaying a preview image of an original pre-scanned in the preview-edit process.
Figure 14:
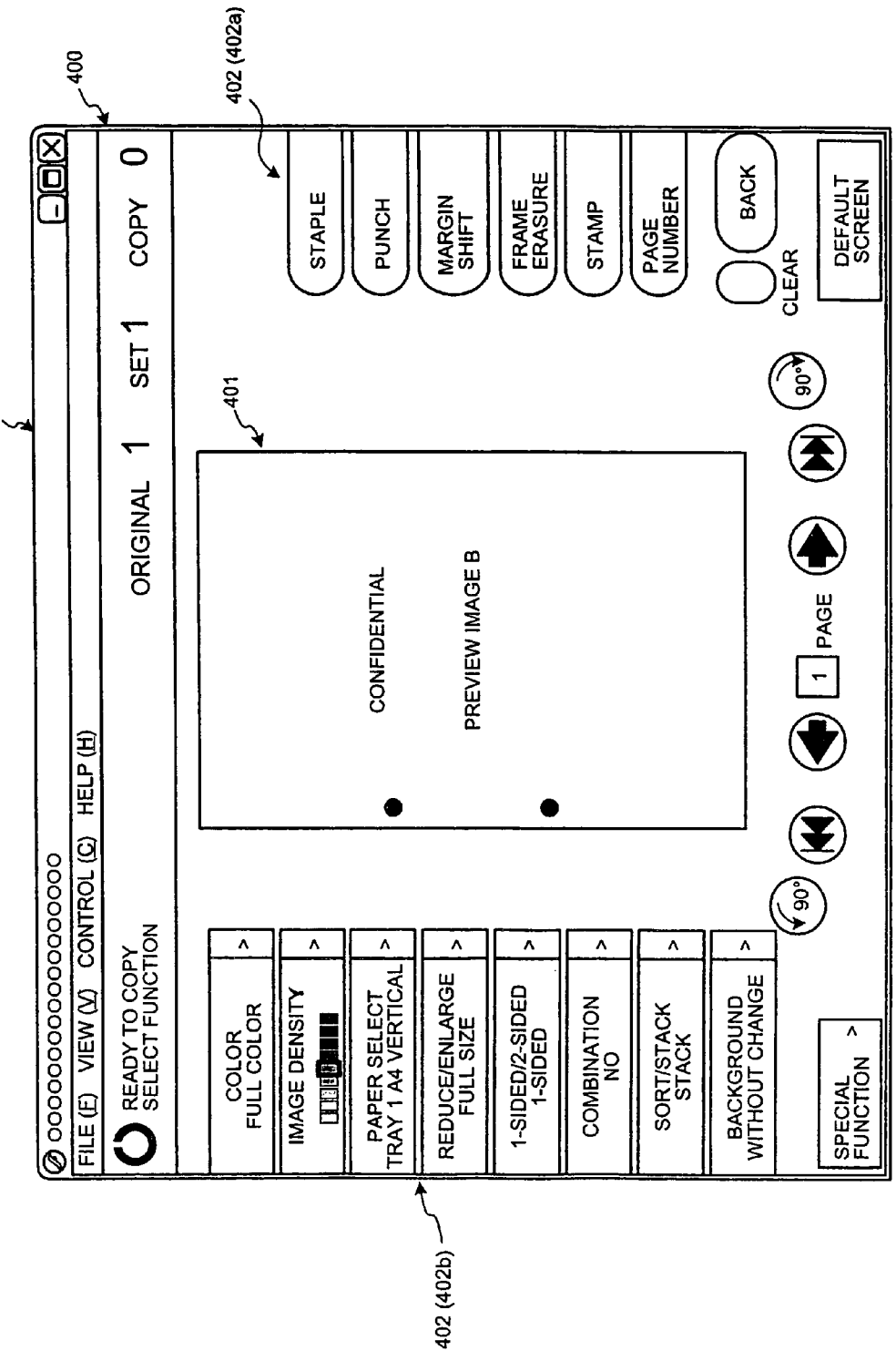
FIG. 14 is the input screen displaying a preview image to which the last setting is applied in the preview-edit process.

A second embodiment of the present invention is explained referring to FIGS. 12 to 14. Like reference characters refer to like or corresponding components as in the first embodiment, and the same explanations are not repeated.

In the first embodiment, a user selects, before pre-scanning, whether the last setting is to be restored to improve convenience of the user. However, when the last setting is restored before pre-scanning for printing, a user may not be able to specify appropriate settings dependent on a characteristic value of an original image. For example, when margin shift is taken into account, margin shift amounts of the last original and the present original are not always the same.

Thus, in the second embodiment, a user selects, after pre-scanning, whether the last setting is to be restored. When the last setting is not restored, usual preview display is performed without restoring the setting. When the setting is restored, a preview reflecting the last setting is displayed.

FIG. 12 is a flowchart of a preview-edit process according to the second embodiment. As shown in FIG. 12, first, the CPU displays the default screen 500 such that a user can select, after pre-scanning (step S31), whether the last setting is restored (step S1).

When the "No" button B2 is selected via the touch panel 15a, the CPU judges that the last setting is not restored (No at step S1), and printing is performed in a conventional manner. In other words, as shown in FIG. 13, the CPU displays an image of the original pre-scanned at step S31 on the display panel 15b as the preview image 401 (step S3). When the user selects one of the setting items 402 via the touch panel 15a (step S4), the CPU saves (stores) the setting item selected (step S5) and displays, on the display panel 15b, the preview image 401 in which the setting is immediately reflected (step S6).

On the other hand, when the "Yes" button B1 is selected via the touch panel 15a, the CPU judges that the last setting is restored (Yes at step S1). As shown in FIG. 14, the CPU displays the preview image 401 obtained by reflecting the last setting on the image of the original pre-scanned at step S31 on the display panel 15b (step S6).

The user checks the preview image on the screen, and printing starts according to user's operation of the start key (not shown) on the display unit 15. When the printing is started (Yes at step S7), the CPU causes the printer 14 to print the original image scanned by the scanner 11 (step S11).

When the user does not start printing (No at step S7) and additionally selects one of the setting items 402 via the touch panel 15a (step S4), the CPU performs the process at steps S5 and S6 again.

As described above, according to the second embodiment, a user is caused to select, after pre-scanning, whether the last setting is to be restored. When the setting is not restored, usual preview display is performed without restoring the setting. When the setting is restored, a preview reflecting the last setting is displayed. This makes it possible to appropriately carry out setting dependent on a characteristic value of an original image.

Figure 15:
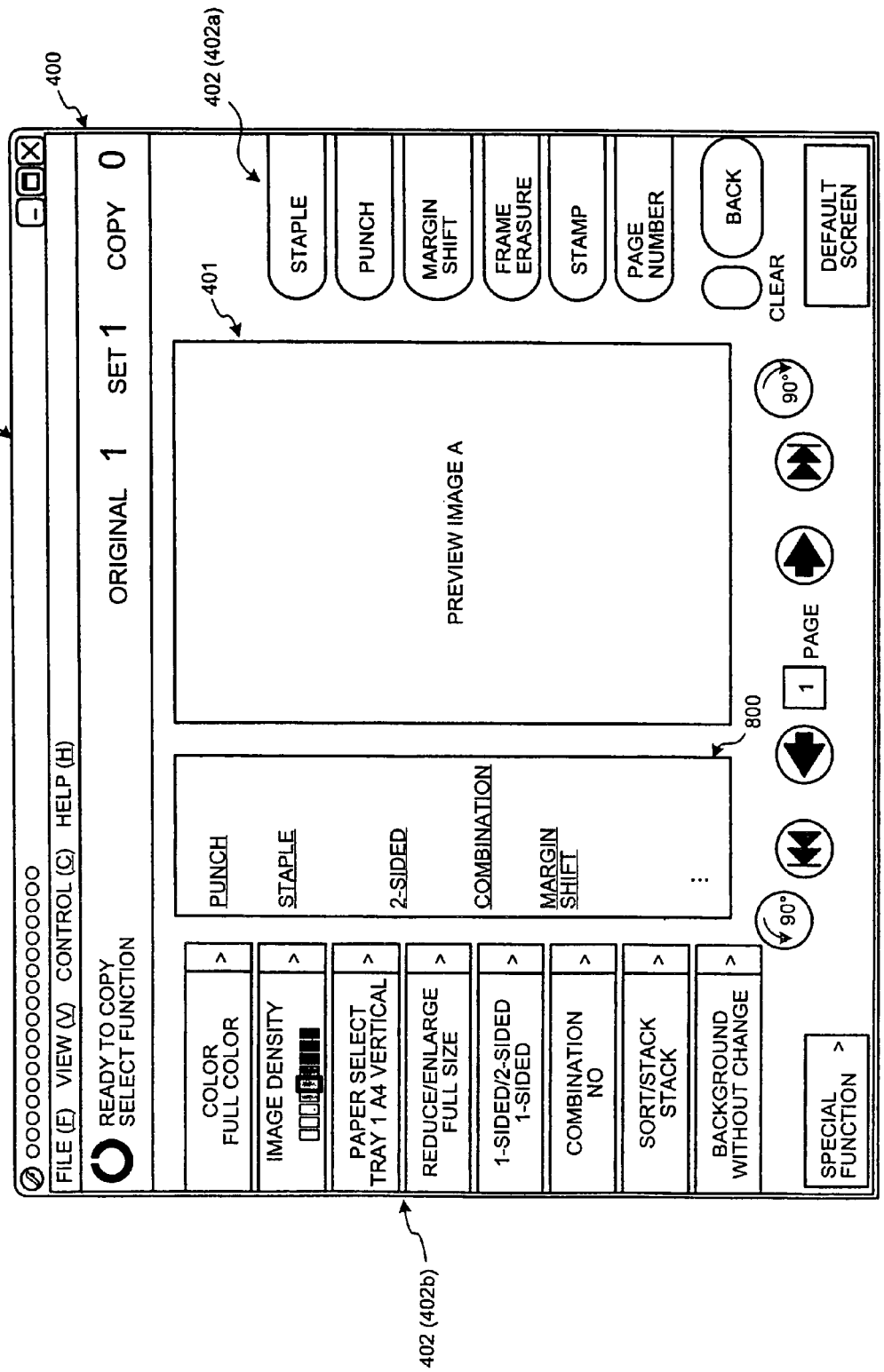
FIG. 15 is the input screen displayed during a preview-edit process according to a third embodiment of the present invention.

A third embodiment of the present invention is explained referring to FIG. 15. Like reference characters refer to like or corresponding components as in the first embodiment and the second embodiment, and the same explanations are not repeated.

In the third embodiment, it is possible to arbitrarily select a setting item previously specified. More specifically, a list of items previously specified is displayed and the user selects a setting item from the list. In this way, the user is supported in restoring a desired setting.

FIG. 15 is an example of a screen displayed during function setting in a preview-edit process according to the third embodiment. The system control unit 16 displays a history window 800 as shown in FIG. 15 during function setting (step S4) to allow a user to select a setting item from the history window 800.

According to the third embodiment, setting items displayed in the history window 800 are displayed as a list according to the following manners:

(1) Time

A setting item most recently used is displayed on the top of the list. With such display of setting items according to time, the last operation can be easily reproduced.

(2) The number of times of use

A setting item used a largest number of times is displayed on the top of the list. When there are setting items with the same number of times of use, a setting item more recently specified is displayed. With such display of setting items according to the number of times of use, it is possible to easily select a setting item most frequently used in the MFP 10.

(3) Time and the number of times of use

A setting item X most recently used is displayed on the top of the list, and a setting item Y most frequently used is displayed thereafter. When there are setting items with the same number of times of use, a setting item more recently specified is displayed. With such display of setting items according to the number of times of use after a setting item most recently used, it is possible to easily select a setting item most frequently used after the setting item most recently used.

List display in the history window 800 can be changed according to a combination of settings. For example, in the case of full color printing, "punch" is displayed on the top of the list. From the setting items 402 or the history window 800, the user selects a desired function via the touch panel 15a.

As described above, according to the third embodiment, a list of setting items specified in the past is displayed. A user selects a setting item from the list. Thus, it is possible to support the user in restoring a desired setting state.

Figure 16:
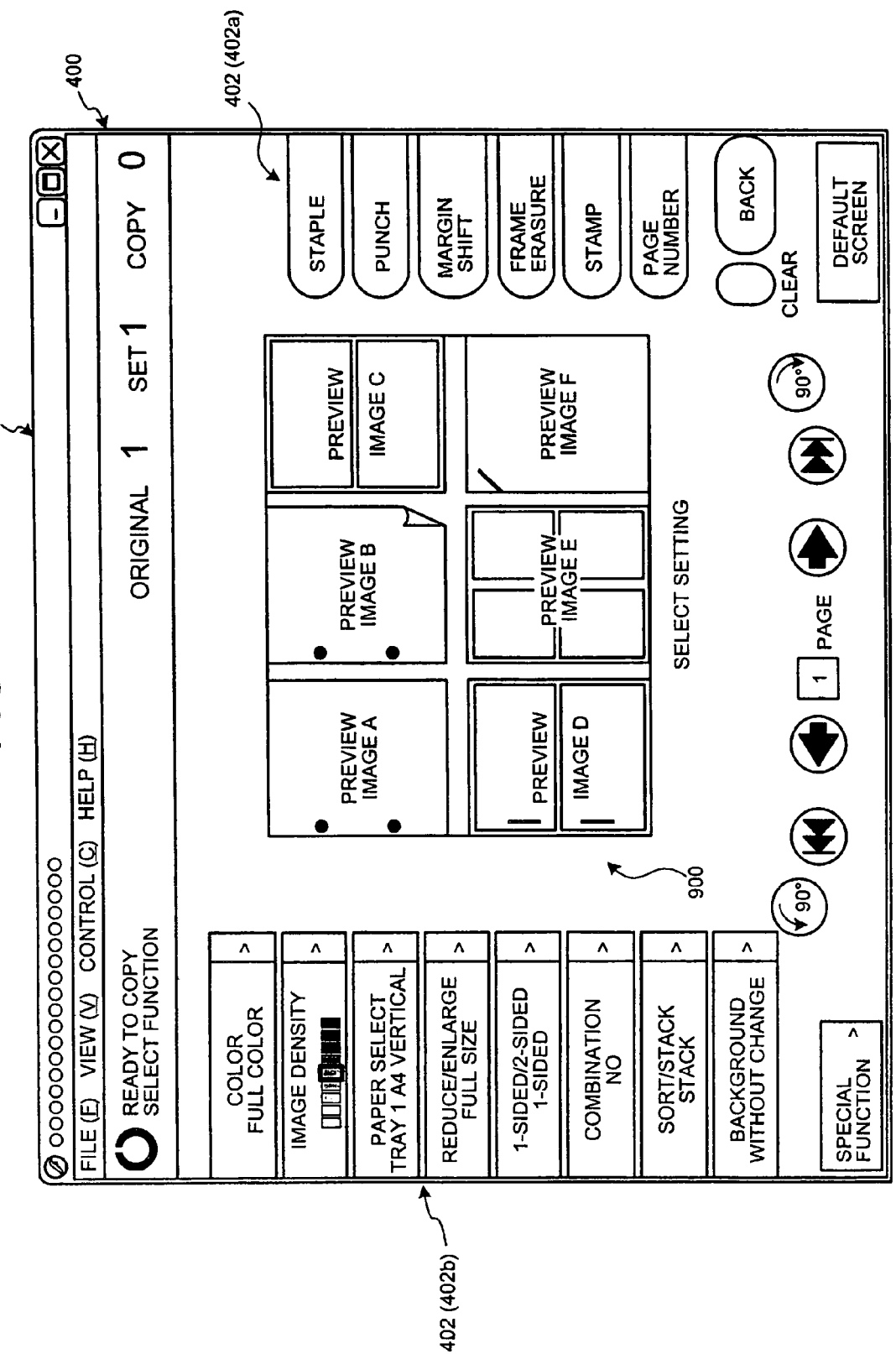
FIG. 16 is the input screen displayed during a preview-edit process according to a fourth embodiment of the present invention.

A fourth embodiment of the present invention is explained referring to FIG. 16. Like reference characters refer to like or corresponding components as in the first embodiment and the second embodiment, and the same explanations are not repeated.

In the fourth embodiment, setting items presently specified for an image to be printed are compared with setting items for previous preview images. A preview image with setting items in high coincidence with those of the image to be printed is displayed to reduce trial and erroneous settings by the user, which enables efficient printing operation.

FIG. 16 is an example of a screen displayed during function setting in a preview-edit process according to the fourth embodiment. During function setting (step S4), a history window 900 shown in FIG. 16 is displayed on the touch panel 15a such that a setting item can be selected from the history window 900.

In the history window 900, setting items presently specified are compared with setting items previously specified. A preview image with setting items in high coincidence with those presently specified are displayed in higher orders (at the left end in FIG. 16). The coincidence between the setting items is determined as follows.

Coincidence of a history (previous preview image) N=(the number of setting items presently specified/the number of setting items of the history N)×(the number of setting items presently specified that coincides with those of the history N/the number of the setting items of the history N)

For example, when the present setting items are A, B, C, and D and the setting items of the history N are A, B, X, Y, and Z, the coincidence is calculated as 0.32 for the history N as follows:

Coincidence of the history $N=(4/5)\times 2/5)=0.32$

As described above, according to the fourth embodiment, a preview with high coincidence of setting items is displayed as shown in FIG. 16. Thus, it is possible to reduce trial and error of setting by the user and realize efficient printing operation.

In the first to fourth embodiments, the MFP 10 is explained as an example of the image processing apparatus. However, the same function as the image processing apparatus described above can be implemented by a combination of an image forming apparatus such as a printer and a computer installed with a predetermined computer program. In this case, the printer is connected to the computer, and a central processing unit (CPU) of the computer reads the computer program from a storage device, such as a hard disk (HD), and executes the computer program.

Figure 17:
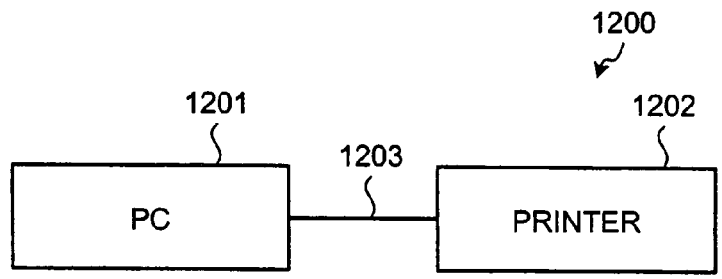
FIG. 17 is a block diagram of a print system according to a fifth embodiment of the present invention.

FIG. 17 is a block diagram of a print system 1200 according to a fifth embodiment of the present invention. The print system 1200 includes a personal computer (PC) 1201 that issues a print job including print data, and a printer 1202 that prints the print data. The PC 1201 and the printer 1202 are connected via a cable 1203.

The PC 1201 sends print data corresponding to a created document and print conditions set for printing the print data to the printer 1202 as a print job. Examples of the print conditions include sheet direction, one-sided/two-sided, combination (2 in 1, 4 in 1, etc.), bookbinding, staple, punch, and reduce/enlarge.

The printer 1202 prints the print data according to the print job received from the PC 1201. Specifically, the printer 1202 prints the print data included in the print job on a medium such as paper according to the print conditions (sheet direction, one-sided/two-sided, combination, bookbinding, staple, punch, reduce/enlarge, etc.) included in the print job.

Figure 18:
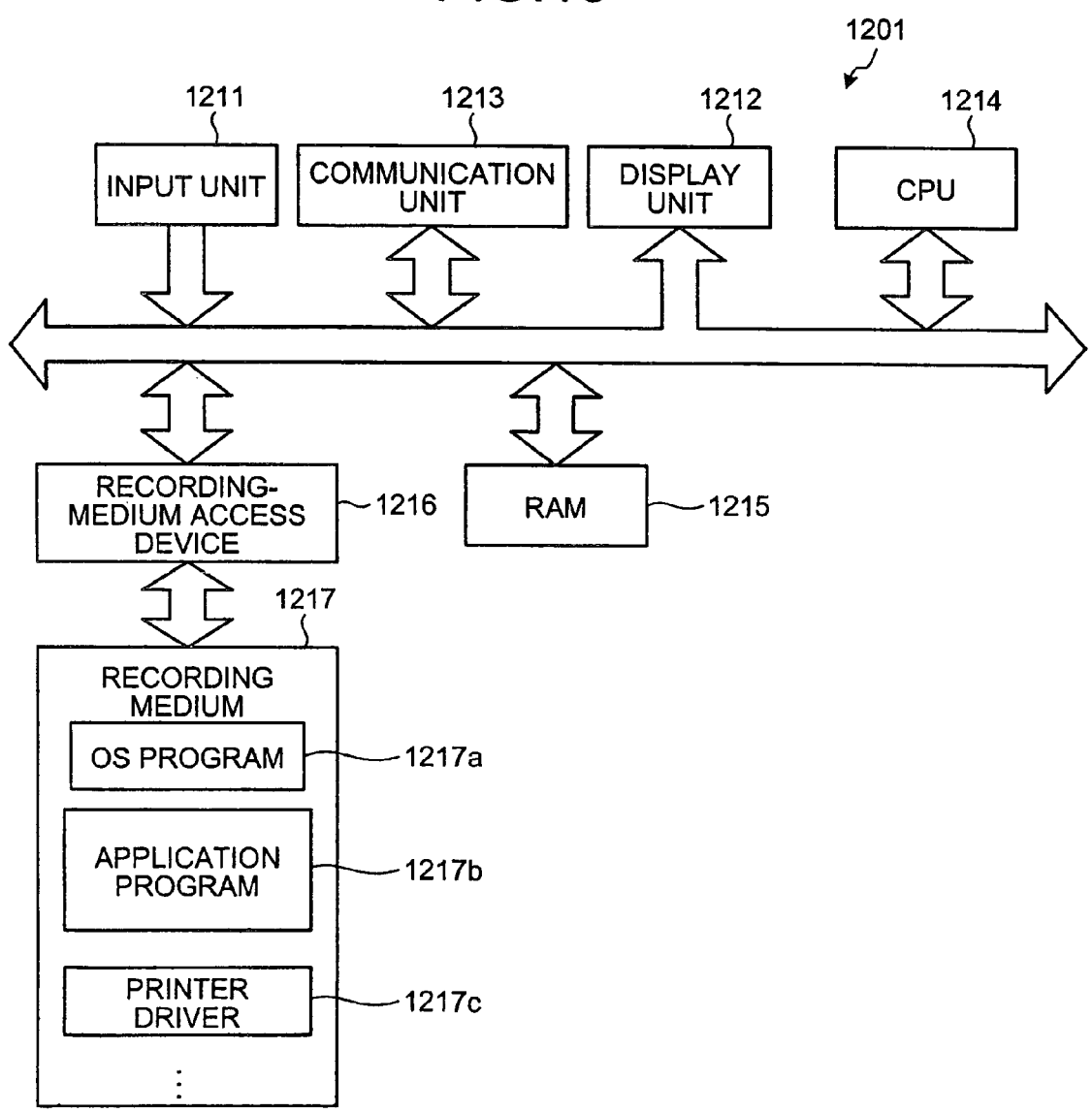
FIG. 18 is a block diagram of a personal computer shown in FIG. 17.

FIG. 18 is a block diagram of the PC 1201. The PC 1201 includes an input unit 1211 for inputting data, a display unit 1212, a communication unit 1213 for data communication, a CPU 1214 that controls the apparatus, a RAM 1215 used as a work area of the CPU 1214, a recording-medium access device 1216 that reads data from and writes data to a recording medium 1217. The recording medium 1217 stores therein various computer programs and the like for the CPU 1214.

The input unit 1211 includes a keyboard with cursor keys, number keys, and various function keys, a mouse, and a slice pat for selecting a key and the like on a display screen. The input unit 1211 is an interface with which the user gives an instruction to the CPU 1214 and inputs data.

The display unit 1212 includes a cathode ray tube (CRT), a liquid crystal display (LCD), or the like. On the display unit 1212, display data from the CPU 1214 is displayed. Through the communication unit 1213, data is communicated with, for example, the printer 1202 via the cable 1203.

The CPU 1214 controls the apparatus according to the computer programs stored in the recording medium 1217. The input unit 1211, the display unit 1212, the communication unit 1213, the RAM 1215, and the recording-medium access device 1216 are connected to the CPU 1214. The CPU 1214 controls data communication, readout of an application program and read and write of various data through access to a memory, data and command input, display, and the like. The CPU 1214 sends print data and print conditions of the print data input from the input unit 1211 to the printer 1202 via the communication unit 1213 as a print job.

The RAM 1215 includes a work memory that stores therein designated computer programs, input instruction, input data, processing result, etc., and a display memory that temporarily stores therein display data to be displayed on the display unit 1212.

The recording medium 1217 stores therein various computer programs such as an OS program 1217a (e.g., WINDOWS (registered trademark)) executable by the CPU 1214, an application program 1217b for document creation, and a printer driver 1217c corresponding to the printer 1202. The recording medium 1217 is, for example, an optical, magnetic, or electric recording medium such as a flexible disk, a hard disk, a CD-ROM, a DVD-ROM, an MO, or a PC card. The computer programs are stored in the recording medium 1217 in a data format readable by the CPU 214. The computer programs can be recorded in a recording medium in advance or downloaded via a communication line into a recording medium. The computer programs can also be distributed through a communication line.

Figure 19:
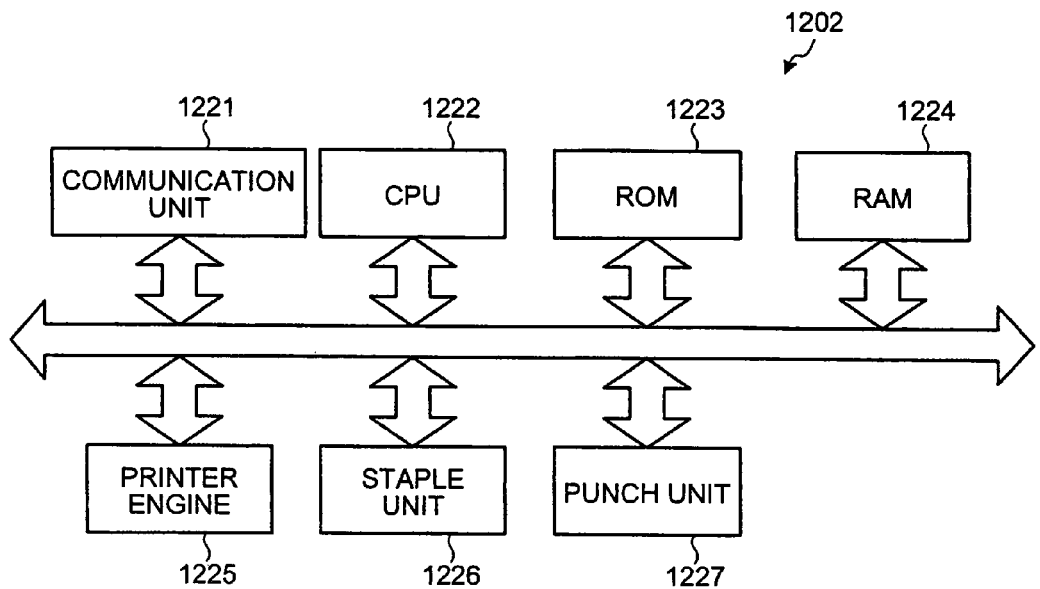
FIG. 19 is a block diagram of a printer shown in FIG. 17.
Figure 20:
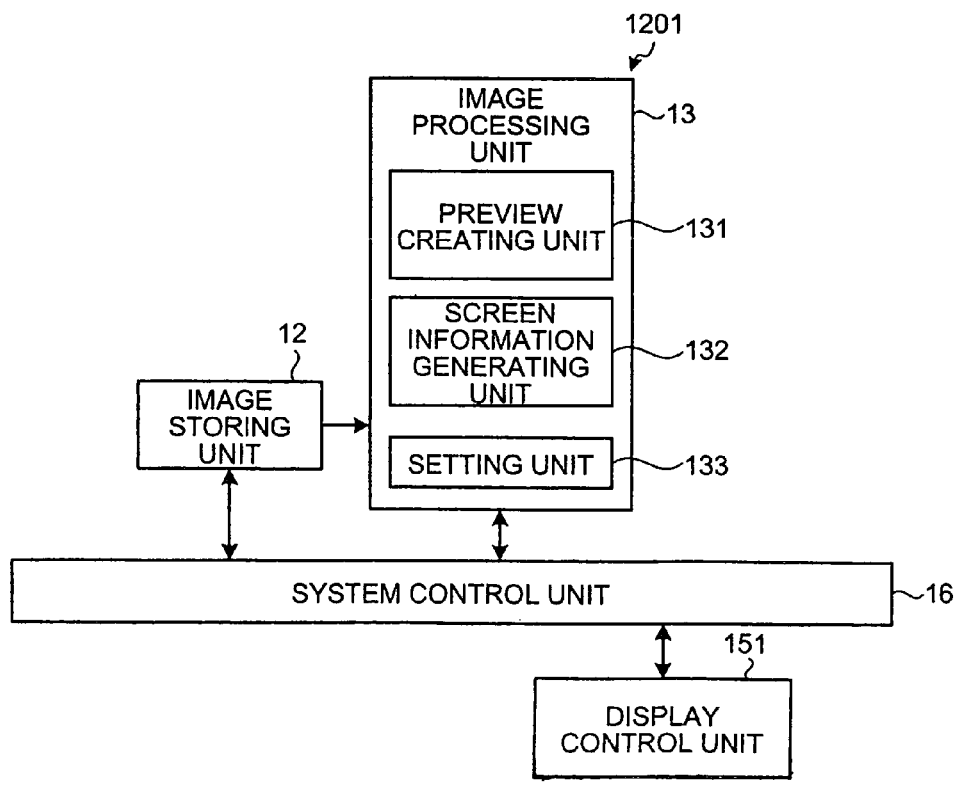
FIG. 20 is a block diagram of a relevant part of the personal computer.

FIG. 19 is a block diagram of the printer 1202. The printer 1202 includes a communication unit 1221 for data communication, a CPU 1222 that controls the printer 1202, a ROM 1223, a RAM 1224, a printer engine 1225, a staple unit 1226, and a punch unit 1227.

The ROM 1223 stores therein various control programs for the CPU 1222. The RAM 1224 is a work area for the control programs and temporarily stores therein print data and print conditions of a print job input from the PC 1201 and the like. The printer engine 1225 performs printing the print data on a transfer sheet. The staple unit 1226 staples sheets on which the print data is printed. The punch unit 1227 opens punch holes in the transfer sheet on which the print data is printed. In other words, the printer 1202 has a duplex printing function, a punch function, a staple function, and the like.

The communication unit 1221 is a unit for performing data communication with the outside. For example, through the communication unit 1221, data is communicated with the PC 1201.

The CPU 1222 controls the apparatus according to various control programs stored in the ROM 1223. The communication unit 1221, the ROM 1223, the RAM 1224, the printer engine 1225, the staple unit 1226, and the punch unit 1227 are connected to the CPU 1222. The CPU 1222 controls data communication, a printer operation, and the like.

The ROM 1223 stores therein various control programs for the CPU 1221 and parameters, etc. used for processing by the CPU 1221. The RAM 1224 includes a work memory that stores therein a designated control program, a processing result, received print data, and the like.

The printer engine 1225 is of an electrophotographic type and prints print data on a transfer sheet. The printer 1202 can employ, besides electrophotographic printing, inkjet printing, sublimation dye transfer printing, silver salt photographic printing, direct thermo-sensitive recording, and thermofusible transfer printing.

The printer driver 1217c is a software program that can be run without being hindered by other computer programs, hardware of the printer 1202, and a language used in the PC 1201. The printer driver 1217c is used for controlling the printer 1202 and processing output data and the like.

The CPU 1214 creates and displays, according to the printer driver 1217c, a preview image based on print data and print conditions of the print data input from the input unit 1211. The CPU 1214 transfers print data created by the application program 1217b to the printer 1202.

The PC 1201 includes the image storing unit 12, the image processing unit 13, the display control unit 151, and the system control unit 16. These units are implemented by the CPU 1214 operating according to the printer driver 1217c.

In this way, with the CPU 1214 executing the printer driver 1217c, the PC 1201 realizes the same function as the MFP 10 shown in FIG. 1. Thus, it is possible to obtain the same effects as previously explained in the first to fourth embodiments.

Figure 21:
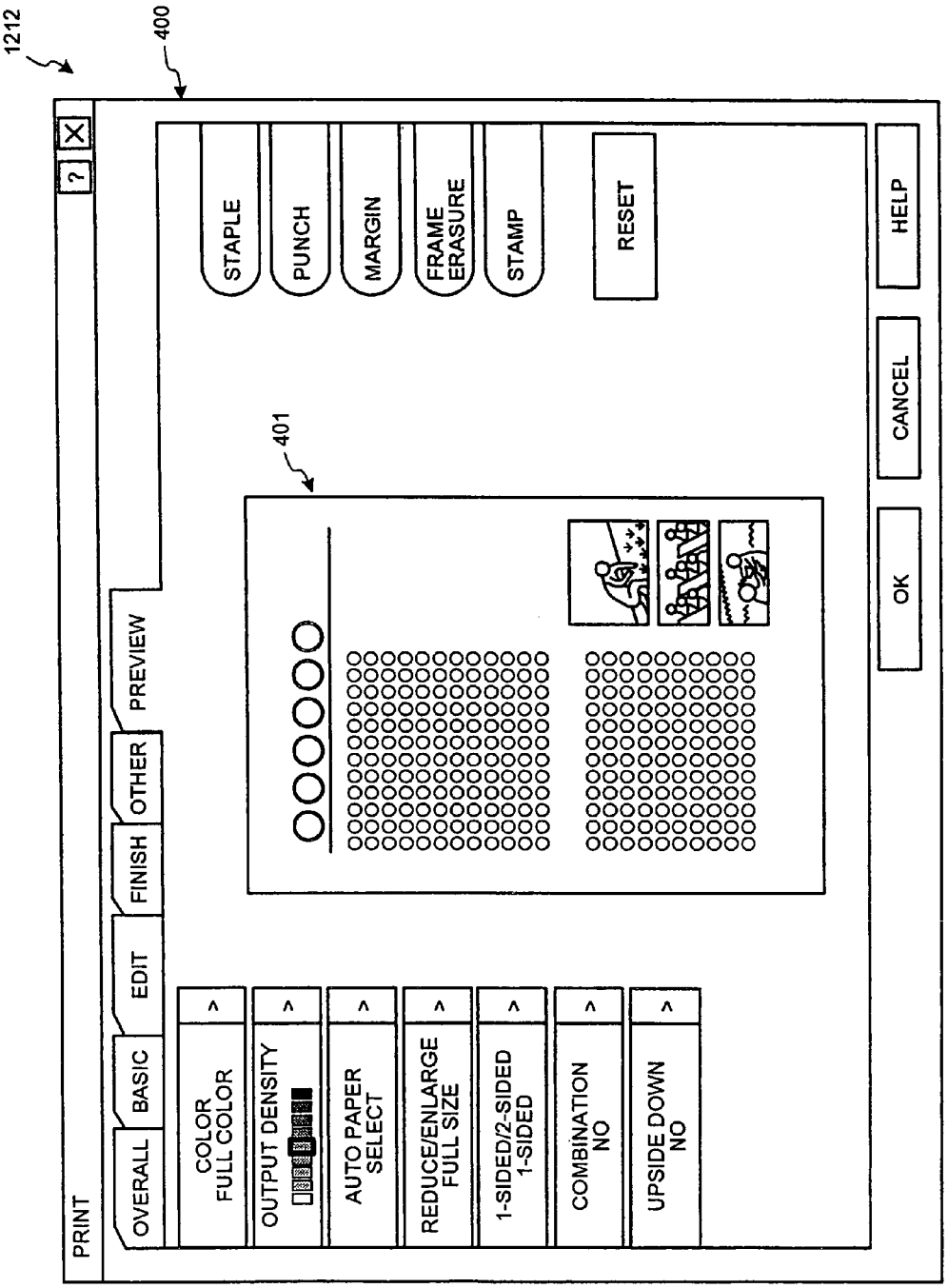
FIG. 21 is an example of a screen displayed by a printer driver.

FIG. 21 is an example of a screen displayed by the printer driver 1217c. The screen shown in FIG. 21 is a display screen for the application program 1217b, a startup screen for an operating system (OS) program 1217a, or the like. The screen is displayed when startup of the printer driver 1217c is selected. In the screen shown in FIG. 21, in addition to a basic input screen, an edit-condition input screen, a finish-condition input screen, and the like, it is possible to select the input screen 400 (equivalent to the input screen 400 of the MFP 10) for creating and displaying a preview image based on print data and print conditions of the print data input from the input unit 1211.

In the fifth embodiment, upon execution of the printer driver 1217c by the CPU 1214, the input screen 400 is displayed for creating and displaying a preview image based on print data and print conditions of the print data input from the input unit 1211. However, the present invention is not limited to this. The input screen 400 can be displayed upon execution of the application program 1217b and the OS program 1217a by the CPU 1214.

As set forth hereinabove, according to an aspect of the present invention, preview of an image to be printed is displayed to allow a user to specify settings or parameters for processing the image. The settings specified on the preview is stored such that the user can restore the settings. Therefore, operationality and convenience for the user can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image data processing apparatus including a display device, the image data processing apparatus comprising:
    a storage unit to store one or more image data each having a process setting;
    a selection screen display unit to display, on the display device, the one or more image data stored in the storage unit and to display, on the display device, a selection screen to select whether to use a process content associated with one of image data selected from the displayed image data if the one segment of image data is used; and
    a display control unit to display, on the display device, a preview image reflecting the process content based on the associated process content.

2. The image data processing apparatus according to claim 1, wherein the display control unit displays a screen from which a new process setting is performed if the process content associated with the image data is not used.

3. The image data processing apparatus according to claim 1, wherein the storage unit stores image data one of input from the image data processing apparatus and input via a network.

4. A method for controlling a display of an image associated with an image data processing apparatus including a display device to, the method comprising:
    reading one or more image data each including a process setting from a storage unit;
    displaying the one or more image data on the display device;

displaying, on the display device, a selection screen to select whether to use a process content associated with one of image data selected from the display image data if the one of image data is used; and displaying a preview image associated with the process content on the display device if using the process content associated with the image.

5. The method according to claim 4, wherein the displaying of a preview image includes displaying a screen from which a new process setting is performed on the image data if the process content associated with the image data is not used.

6. The method according to claim 4, wherein the reading includes reading image data one of input from the image data processing apparatus and input via a network.

7. A non-transitory computer-readable medium including computer-readable program codes embodied in the medium that when executed by a processor causes an image data processing apparatus including a display device to perform steps comprising:

reading one or more image data each including a process setting from a storage unit;

displaying the one or more image data on the display device;

displaying, on the display device, a selection screen to select whether to use a process content associated with one of image data selected from the display image data if the one segment of image data is used; and displaying a preview image associated with the process content on the display device if using the process content associated with the image.

8. The non-transitory computer-readable medium according to claim 7, wherein the displaying of a preview image includes displaying a screen from which a new process setting is performed on the image data if the process content associated with the image data is not used.

9. The non-transitory computer-readable medium according to claim 7, wherein the reading includes reading image data one of input from the image data processing apparatus and input via a network.

* * * * *